United States Patent
Tanskanen et al.

(10) Patent No.: US 9,613,034 B2
(45) Date of Patent: *Apr. 4, 2017

(54) METHODS, APPARATUSES AND COMPUTER PROGRAM PRODUCTS FOR UPDATING A CONTENT ITEM

(71) Applicant: HERE Global B.V., Veldhoven (NL)

(72) Inventors: Erkki Juhani Tanskanen, Vantaa (FI); Markus Henrik Kaikkonen, Oulu (FI); Pekka Kalervo Valipirtti, Kempele (FI); Mikko Nirhamo, Berlln (DE); Esa Pekka Isomursu, Oulu (FI); Kirsti Anitta Simula, Kiviniemi (FI)

(73) Assignee: HERE Global B.V., Veldhoven (NL)

(\*) Notice: Subject to any disclaimer, the term of this patent is extended or adjusted under 35 U.S.C. 154(b) by 0 days.

This patent is subject to a terminal disclaimer.

(21) Appl. No.: 14/834,725

(22) Filed: Aug. 25, 2015

(65) Prior Publication Data
US 2015/0365903 A1  Dec. 17, 2015

Related U.S. Application Data

(63) Continuation of application No. 12/100,764, filed on Apr. 10, 2008, now Pat. No. 9,152,208.

(51) Int. Cl.
*G06F 17/30* (2006.01)
*G06F 1/32* (2006.01)
*H04W 52/02* (2009.01)

(52) U.S. Cl.
CPC ...... *G06F 17/30067* (2013.01); *G06F 1/3228* (2013.01); *G06F 17/30905* (2013.01); *H04W 52/0251* (2013.01)

(58) Field of Classification Search
USPC ............................... 707/802–812
See application file for complete search history.

(56) References Cited

U.S. PATENT DOCUMENTS 5,802,304 A  9/1998 Stone
6,088,707 A  7/2000 Bates et al.
(Continued)

FOREIGN PATENT DOCUMENTS

CN  1574873 A  2/2005
EP  1 276 336 A2  1/2003
(Continued)

OTHER PUBLICATIONS

Bill Schilit et al., Context-Aware Computing Applications, 1995, IEEE, 85-90.*
(Continued)

*Primary Examiner* — Jean B Fleurantin
(74) *Attorney, Agent, or Firm* — Alston & Bird LLP

(57) ABSTRACT

Methods, apparatuses and computer program products are provided for updating a content item. In this regard, a current context associated with a content item can be determined based on criteria such as, a user's tendencies, user preferences, battery level, time of day, etc. The current context of the content item can be active or inactive. If a content item is in an active current context and an associated triggering event occurs, the content item can be updated. If the content item is in an inactive current context, the content item need not be updated. Content items may be updated in various manners, including generating a preview of the content item. A preview of a content item may be generated by retrieving the content item via an interface, where the interface is determined from data associated with the content item. Upon retrieval of a content item via the interface, a preview of the content item can be generated, such as by generating an image file having associated metadata. The metadata maybe used for linking the preview to additional, related content items.

20 Claims, 8 Drawing Sheets

(56) References Cited

U.S. PATENT DOCUMENTS

| | | |
|---|---|---|
| 6,278,449 B1 | 8/2001 | Sugiarto et al. |
| 6,341,316 B1 | 1/2002 | Kloba et al. |
| 6,351,467 B1 | 2/2002 | Dillon |
| 6,381,592 B1 | 4/2002 | Reuning |
| 6,421,717 B1 | 7/2002 | Kloba et al. |
| 6,493,758 B1 | 12/2002 | McLain |
| 6,505,242 B2 | 1/2003 | Holland et al. |
| 6,553,412 B1 | 4/2003 | Kloba et al. |
| 6,591,288 B1 | 7/2003 | Edwards et al. |
| 6,611,862 B2 | 8/2003 | Reisman |
| 6,615,276 B1 | 9/2003 | Mastrianni et al. |
| 6,658,464 B2 | 12/2003 | Reisman |
| 6,779,042 B1 | 8/2004 | Kloba et al. |
| 6,820,116 B1 | 11/2004 | Pyhalammi et al. |
| 6,839,744 B1 | 1/2005 | Kloba et al. |
| 6,883,020 B1 | 4/2005 | Taranto et al. |
| 7,188,240 B1 | 3/2007 | Berstis et al. |
| 2001/0003828 A1 | 6/2001 | Peterson et al. |
| 2001/0007105 A1 | 7/2001 | Brotz et al. |
| 2002/0010758 A1 | 1/2002 | Chan |
| 2003/0006912 A1 | 1/2003 | Brescia |
| 2004/0012625 A1 | 1/2004 | Lei et al. |
| 2004/0248588 A1 | 12/2004 | Pell et al. |
| 2005/0188051 A1 | 8/2005 | Sneh |
| 2006/0004923 A1 | 1/2006 | Cohen et al. |
| 2006/0047775 A1 | 3/2006 | Bruck et al. |
| 2006/0080404 A1 | 4/2006 | Haber-Land-Schlosser |
| 2006/0277481 A1* | 12/2006 | Forstall et al. ............... 715/764 |
| 2007/0011130 A1 | 1/2007 | Yamabuchi |
| 2007/0038931 A1 | 2/2007 | Allaire et al. |
| 2008/0162615 A1* | 7/2008 | Hurmola et al. ............. 708/112 |
| 2009/0259936 A1* | 10/2009 | Tanskanen et al. ........... 715/700 |
| 2010/0287479 A1 | 11/2010 | Pell et al. |

FOREIGN PATENT DOCUMENTS

| | | |
|---|---|---|
| EP | 1 486 889 A1 | 12/2004 |
| EP | 1 631 035 A1 | 3/2006 |
| WO | WO 2004/042606 A2 | 5/2004 |

OTHER PUBLICATIONS

Extended European Search Report for European Application No. 09729235.3, dated Apr. 9, 2012, All Pages.

International Search Report and Written Opinion from coresopnding International Application No. PCT/FI2009/050218 dated Jul. 8, 2009, All Pages.

International Search Report and Written Opinion from corresponding International Application No. PCT/IB2008/052305 dated Dec. 4, 2008, All Pages.

Jiang et al., "Web Prefetching in a Mobile Environment," IEEE Personal Communications, pp. 25-34, Oct. 1998.

Joshi et al., "On Disconnected Browsing of Distributed Information," Research Issues in Data Engineering—IEEE Comput. Soc., Apr. 1997, All Pages.

Ma Wei-Ying et al.; "A Framework for Adaptive Content Delivery in Heterogeneous Network Environments;" dated Jan. 24, 2000; Hewlett-Packard Laboratories, All Pages.

Office Action—Appeal Brief for U.S. Appl. No. 12/100,764 dated Mar. 29, 2012, All Pages.

Office Action—Examiner's Answer for U.S. Appl. No. 12/100,764 dated Aug. 31, 2012, All Pages.

Office Action—Notice of Allowance for U.S. Appl. No. 11/771,493 dated Jan. 5, 2012, All Pages.

Office Action—Notice of Allowance for U.S. Appl. No. 11/771,493 dated Sep. 27, 2011, All Pages.

Office Action—Notice of Allowance for U.S. Appl. No. 12/100,764 dated May 28, 2015, All Pages.

Office Action—Notice of Allowance for U.S. Appl. No. 12/100,764 dated May 4, 2015, All Pages.

Office Action for Japanese Patent Application No. 2010-512816 dated Nov. 8, 2011, All Pages.

Office Action for Korean Application No. 10-2010-7002183 dated May 30, 2011, All Pages.

Office Action for U.S. Appl. No. 11/771,493 dated Jan. 5, 2011, All Pages.

Office Action for U.S. Appl. No. 11/771,493 dated Jun. 18, 2009, All Pages.

Office Action for U.S. Appl. No. 11/771,493 dated Jun. 25, 2010, All Pages.

Office Action for U.S. Appl. No. 11/771,493 dated Nov. 20, 2009, All Pages.

Office Action for U.S. Appl. No. 12/100,764 dated Aug. 3, 2010, All Pages.

Office Action for U.S. Appl. No. 12/100,764 dated Mar. 16, 2011, All Pages.

Office Action from Chinese Patent Application No. 200980112670.X dated Aug. 20, 2014, All Pages.

Office Action from Chinese Patent Application No. 200980112670.X dated Feb. 12, 2014, All Pages.

Office Action from Chinese Patent Application No. 200980112670.X dated Feb. 2, 2015, All Pages.

Office Action from Chinese Patent Application No. 200980112670.X, dated Sep. Sep. 5, 2012, All Pages.

Schilit, Bill et al.; "Context-Aware Computing Applications"; 1995; IEEE; pp. 85-90, All Pages.

WebStripper Offline Browser. Download Web Sites and Browse Offline [online] [retrieved Mar. 8, 2007]. Retrieved from the Internet: <URL: http://webstripper.net/features.html>. 4 pages.

\* cited by examiner

METHODS, APPARATUSES AND COMPUTER PROGRAM PRODUCTS FOR UPDATING A CONTENT ITEM

CROSS REFERENCE TO RELATED APPLICATION

This application is a continuation of and claims priority to U.S. application Ser. No. 12/100,764, filed Apr. 10, 2008, entitled, "Methods, Apparatuses And Computer Program Products For Updating A Content Item," the entire contents of which are hereby incorporated by reference.

TECHNOLOGICAL FIELD

Embodiments of the present invention relate generally to retrieving information or content and, more particularly, relate to various methods, apparatuses and computer program products for updating content items associated with an electronic device.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

This explosive growth of mobile communications networks has followed the evolution of mobile devices, such as cellular phones, personal digital assistants (PDAs), and other portable electronic devices from luxury items to ubiquitous devices integrated into the everyday lives of individuals from all walks of life. The widespread adoption of mobile devices, and the expanding capabilities of the wireless networks over which they communicate, has allowed for a tremendous expansion in the applications which mobile devices are capable of executing. In addition to providing for phone service, many mobile devices now execute applications such as email retrieval, web browsing, web feed services, navigation services through the use of GPS, camera and video capturing, digital music and video playback. In some instances, users may be unaware applications are running processes in the background to provide services to the user. These and other applications may also interface with networks to transmit and receive data for a user.

While this expansion in the applications of mobile devices has been revolutionary, the added applications do have drawbacks. For example, each additional application executed by a mobile can also have corresponding power consumption. Additionally, users may not appreciate the power consumption and processing consumption associated with these applications, since many applications may include processes running in the background. As such, overall power consumption of mobile terminals is becoming increasingly problematic for users because batteries are draining at increasing rates. Further, while power utilization is rapidly increasing on mobile terminals, the power storage capacity of mobile devices, i.e., the power storage capacity of batteries, is remaining constant or increasing at a relatively slower pace. Applications that make continuous attempts to retrieve data such as email, web feeds, or other web content can cause substantial reductions in battery levels when considered in the aggregate. The increased and variable power consumption associated with these applications can present problems to users in that batteries can drain at increasingly rapid rates.

Additionally, the increasing number of applications being utilized by mobile terminals is also impacting network resources. For example, an email client may download email to a mobile terminal at some regular interval consuming network during each download. Further, other applications, such as web feeds and various widgets, may also be downloading and/or uploading data across the network consuming resources. Each of these applications also consumes a corresponding portion of the network's resources. In the aggregate, these applications can have significant impacts. As a result latency and quality of service can be detrimentally affected.

Accordingly, it would be advantageous to provide methods, apparatuses, and computer program products that limit power consumption and impact to the network, but also provide for the needs and wants of users. In particular, in would be advantageous to provide applications for electronic devices that are power and network resource conscious, but continue to provide a user with a level of service that is acceptable to the user.

BRIEF SUMMARY

Various methods, apparatuses and computer program products are therefore provided in accordance with embodiments of the present invention to at least partially address the foregoing issues by providing acceptable service while limiting power consumption. In various embodiment, a method, apparatus and computer program product are provided to update a content item by determining the current context of a content item where the current context of the content item can be based on one or more criteria. In this regard, the current context of a content item may be active or inactive. According to various embodiments, the current context associated with a content item may be determined based upon a current battery level. The exemplary method, apparatus, or computer program product of one embodiment may also identifies the occurrence of a triggering event associated with the content item and updates the content item in response to a triggering event if the current context of the content item is active. A content item with an active current context may be updated, but a content item with an inactive current context may not be updated.

In some embodiments, the triggering event may be the exhaustion of a timer associated with the content item. In this regard, the timer may include a duration where the duration of the timer can be based on one or more criteria. The triggering event may also occur when a current context of a content item is changed to active. Additionally, according to various embodiments, updating the content item can include retrieving the content item and generating a conditioned form of the content item. In some embodiments, the conditioned form of the content item can be a preview.

Further, various methods, apparatuses and computer program products are provided for generating a preview by: determining an interface from data associated with a content item; retrieving the content item via the interface; and generating a preview of the content item with the preview potentially including associated metadata. In some embodiments, the preview can be an image file rendered from the content item. Further, according to various embodiments, the determined interface can be a widget, any kind of feed, application, various other plug-ins, or the like.

Additionally, in some embodiments, a request to update a content item can be received where the request can be generated based on the current context of the content item and a triggering event. Further, some embodiments may include providing for an output of the preview and providing for interaction with the preview via metadata. The interaction with the preview may include linking to a related content item via the metadata; retrieving the related content item; and generating a preview of the related content item. Some embodiments may also include storing the preview in a preview database and retrieving the preview from the preview database.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
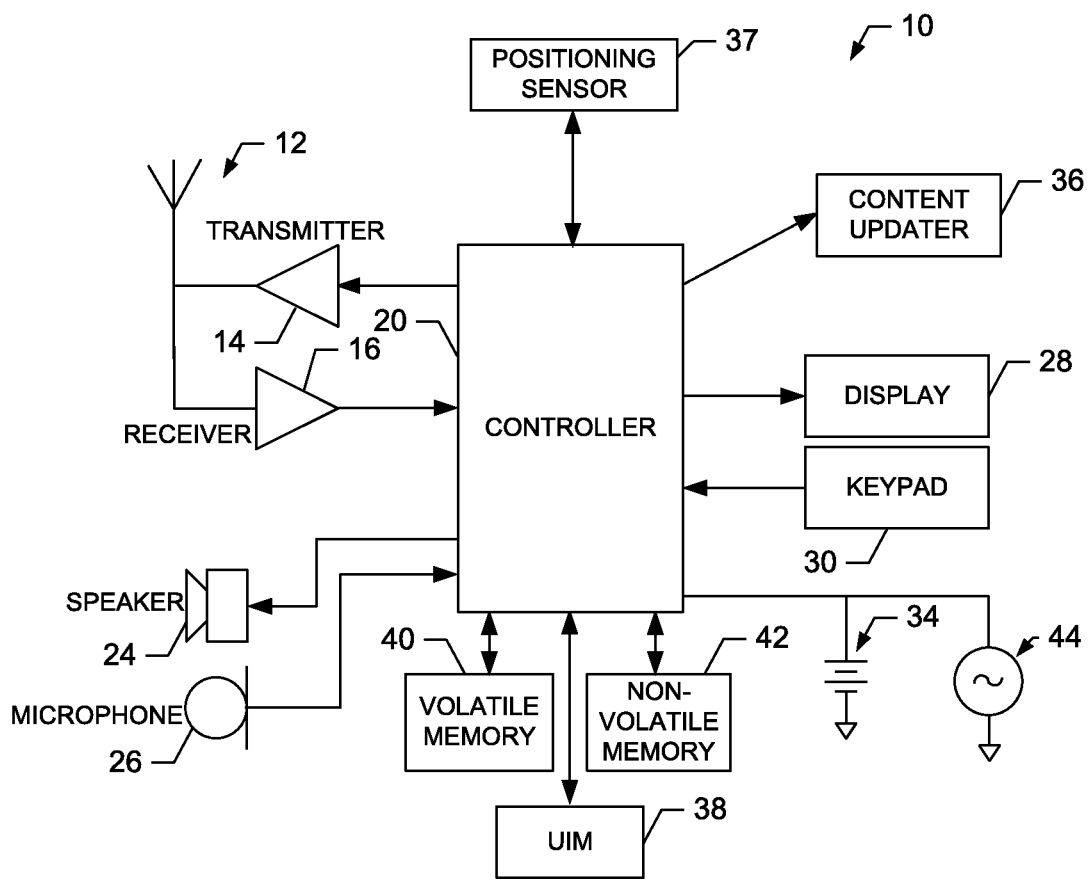
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes an apparatus, such as a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface.

The mobile terminal 10 further includes a battery 34, such as a vibrating battery pack, for powering various circuits that are required to operate the mobile terminal 10, as well as optionally providing mechanical vibration as a detectable output. Mobile terminal 10 can also be powered by supplemental power source 44. Supplemental power source 44 can be any power source that is not the primary power source of mobile terminal 10. Further, supplemental power source 44 can take various forms including, but not limited to a power adapter electrically connected to a wall outlet or other electrical outlet in, for example, a vehicle or airplane. Supplemental power source 44 may provide power directly to mobile terminal 10. Supplemental power source 44 may also indirectly provide power to mobile terminal 10 by charging battery 34, while battery 34 provides power directly to mobile terminal 10. As such, in some embodiments, even though mobile terminal 10 may be connected to supplemental power source 44, mobile terminal 10 may not operate until battery 34 has received a sufficient charge from supplemental power source 44. Further, supplemental power source 44 can be removable from mobile terminal 10 to permit unfettered mobility of mobile terminal 10. When supplemental power source 44 is removed, or disconnected, either physically or electrically, battery 34 can be the sole power source of mobile terminal 10.

Controller 20 of mobile terminal 10 can include functionality and/or circuitry to detect a battery level of battery 34. The battery level can be any indication of the remaining charge or consumption time remaining with respect to battery 34. Controller 20 can use the battery level when considering whether to perform various operations. Controller 20 can also detect whether mobile terminal 10 is connected to a supplemental power source 44. Controller 20 may detect the connection of a supplemental power source directly via, for example, an input to controller 20, or controller 20 may detect the connection of supplemental power source 44 by detecting increasing or maximized battery level reading associated with battery 34.

The mobile terminal 10 may also include a content updater 36. Content updater 36 may be any means, device or circuitry embodied in hardware, software, or a combination of hardware and software that is capable of updating a content item on the mobile terminal 10. Content updater 36 may update a content item to volatile memory 40 or nonvolatile memory 42. A content item can be any type of information or data that has been selected by a user to be kept in an updated state on the mobile terminal. Content items can include, but are not limited to, web pages, web feeds, Really Simple Syndication (RSS) feeds, podcasts, podcast feeds, email, voicemail, Short Message Service (SMS) messages, instant messages, music, videos, material retrieved via plug-ins, material retrieved via widgets (i.e., applications for retrieving an displaying only particular data associated with the widget), or material retrieved via any application utilizing a network connection to access the material. A content item may include information from more than a single location, such as a single web page. In this regard, a content item may include data from multiple locations, such as web pages on a common website and web pages related via links such as hyperlinks. Content items can also include associated data that can be used to determine an interface or application that can be used to retrieve the content item.

In various embodiments, content updater 36 can be a software application that is stored in memory and executed by controller 20 of mobile terminal 10, and as such may be embodied by controller 20 of mobile terminal 10. Content updater 36 can update a content item in response to the current context associated with the content item, i.e., an active or inactive context, and a triggering event. If the current context and triggering event can satisfy various criteria, as described below, mobile terminal 10 can use a connected network, such as the network of FIG. 2, to retrieve and update the content item. The content item can be updated on the mobile device to facilitate fast and power conscious retrieval of the content item or a conditioned version of the content item from memory that can be local to the mobile terminal.

The mobile terminal 10 may further include a positioning sensor 37 such as, for example, a global positioning system (GPS) module in communication with the controller 20. The positioning sensor 37 may be any means, device or circuitry for locating the position of mobile terminal 10. The positioning sensor 37 may include all hardware for locating the position of a mobile terminal 10. Alternatively or additionally, the positioning sensor 37 may utilize a memory device of the mobile terminal 10 to store instructions for execution by the controller 20 in the form of software necessary to determine the position of the mobile terminal 10. Although the positioning sensor 37 of this example may be a GPS module, the positioning sensor 37 may include or otherwise alternatively be embodied as, for example, an assisted global positioning system (Assisted-GPS) sensor, or a positioning client, which may be in communication with a network device to receive and/or transmit information, such as a sky or floor sensor, for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 37 can include a pedometer or inertial sensor. Positioning sensor 37 may also include an accelerometer that can be used to determine if mobile terminal 10 is moving or shaking.

As such, the positioning sensor 37 may be capable of determining a location of the mobile terminal 10, such as, for example, longitudinal and latitudinal directions, and altitude direction of the mobile terminal 10, or a position relative to a reference point such as a destination or start point. Information from the positioning sensor 37 may then be communicated to a memory of the mobile terminal 10 or to another memory device to be stored as a position history or location information. Additionally, the positioning sensor 37 may be capable of utilizing the controller 20 to transmit/receive, via the transmitter 14/receiver 16, location information such as the position of the mobile terminal 10.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
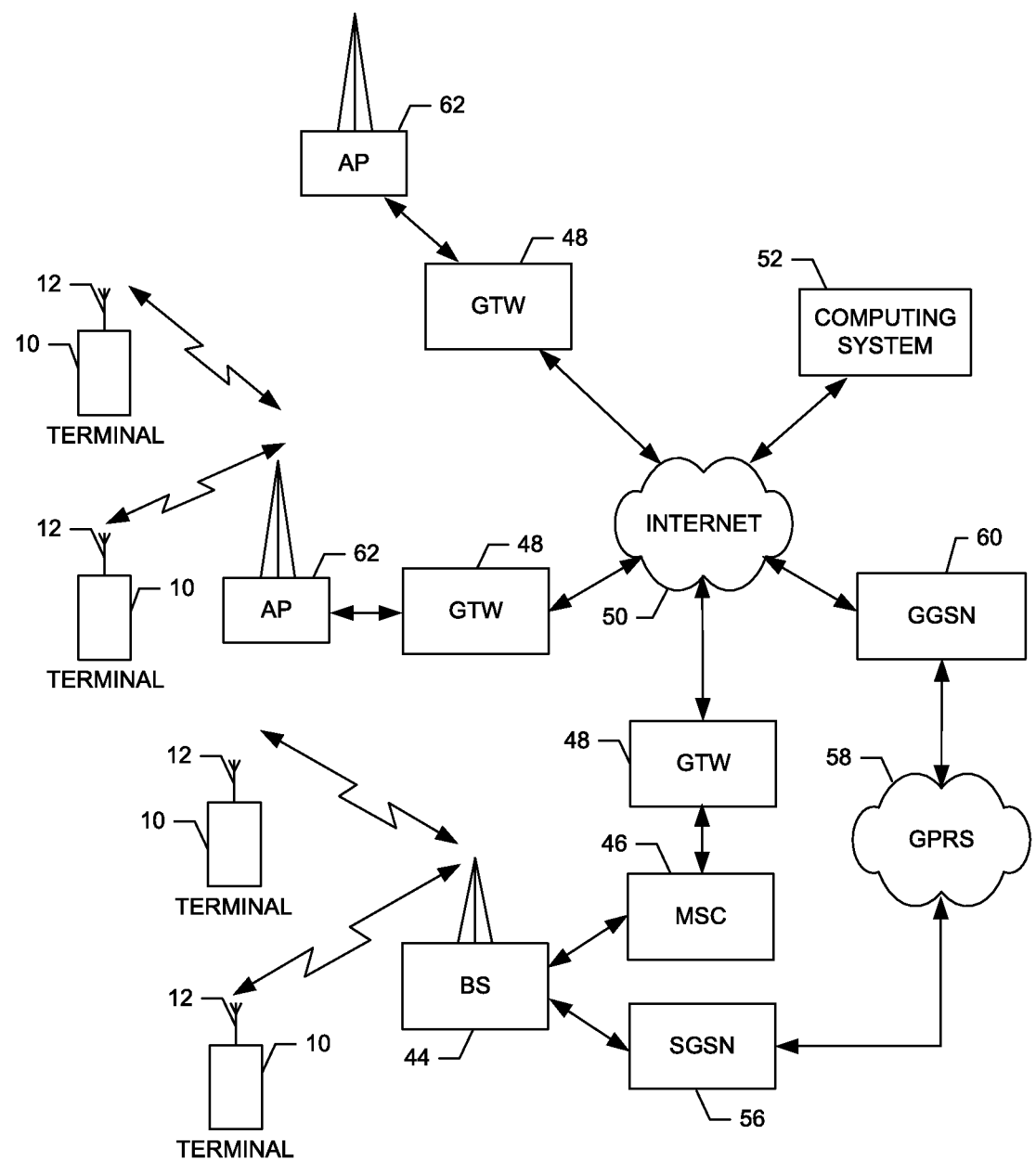
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 and/or the like as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 may be coupled to the mobile terminal 10 via the Internet 50, SGSN 56 and GGSN 60. In this regard, devices such as the computing system 52 may communicate with the mobile terminal 10 across the SGSN 56, GPRS core network 58 and the GGSN 60. By directly or indirectly connecting mobile terminals 10 and the other devices (e.g., computing system 52, federated search service 53, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.) also known as Wi-Fi, world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52 and/or any of a number of other devices, to the Internet 50, the mobile terminals 10 can communicate with one another, or the computing system 52, to thereby carry out various functions of the mobile terminals 10, such as to transmit data, content or the like to, and/or receive content, data or the like from, the computing system 52.

Although not shown in FIG. 2, in addition to or in lieu of coupling the mobile terminal 10 to computing systems 52 and/or federated search service 53 across the Internet 50, the mobile terminal 10 and computing system 52 and/or the federated search service 53 may be coupled to one another and communicate in accordance with, for example, RF, BT, IrDA or any of a number of different wireline or wireless communication techniques, including LAN, WLAN, WiMAX, UWB techniques and/or the like. One or more of the computing system 52 and federated search service 53 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals) Like with the computing system 52 and federated search service 53, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

Figure 3:
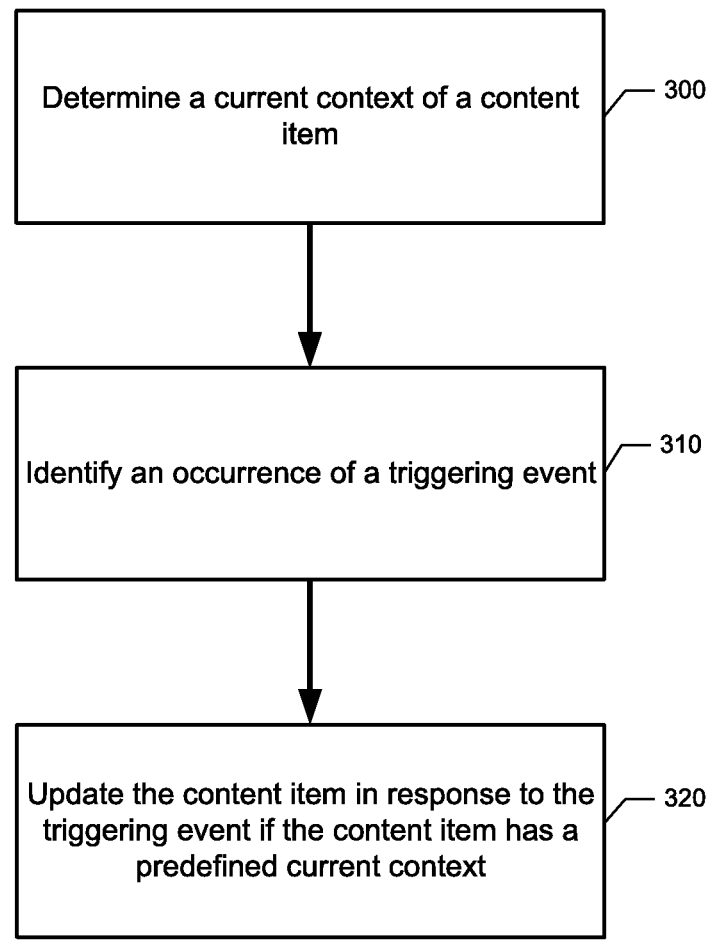
FIG. 3 is a flowchart of a method of updating a content item according to an exemplary embodiment of the present invention.

FIG. 3 depicts a method of updating a content item according to various embodiments of the invention. The method can include determining the current context of a content item at 300, identifying an occurrence of a triggering event 310, and updating the content item in response to the triggering event if the content item has a predefined current context.

At 300, the current context of a content item can be determined by, for example, content updater 36, controller 20 of mobile terminal 10 or other means. The current context can be determined with respect to a content item, and the current context can be set to a predefined current context. According to various embodiments, a current context can be set to active or inactive. In some embodiments, a current context may also be set to additional or different states, such as, for example, a current context can be set to sleep, vacation, home, etc. In embodiments where an active current context is defined, situations may result where some content items are set to an active current context, while others are not. According to various embodiments of the present invention, when the current context of a content item is active, the content item may be updated, and when the current context of a content item is inactive, the content item may not updated.

In determining whether the current context is active or inactive, various criteria can be considered. Any number of criteria may be considered in determining the current context of a content item, for example, a heuristic approach may be employed that evaluates numerous criteria, or, in some embodiments, a single criterion may unilaterally determine the current context. Criteria that may be considered, can include, but should not be limited to, past user tendencies, user preferences, battery level, location, available networks, time of day, scheduled events, such as calendar or alarm clock events, current user interactions with the mobile terminal and a current profile of a mobile terminal. With regard to the various criteria, in some embodiments, the current context may be dependant upon the context of a device that may output the content. As such, criteria may be considered that target context of the device. For example, the context of a mobile terminal 10 having a low battery may be considered in determining the context of a content item.

Based on the criteria, a current context may be determined by evaluating the criteria in accordance with predefined rules or in accordance with a predefined algorithm. In this regard, the current context of all or at least a plurality of content items can be determined in accordance with a common set of rules or algorithms, or separate rules or algorithms may be utilized to determine the current context of each different content item. Through the use of these various rules or algorithms, the current context can be determined so as to reduce the impact of updating content items on resources so as to conserve power and processing capability, while limiting the impact of non-continuous content updates on the user, that is, by ensuring that the content that is likely to be of interest to the user is up to date even if other content, i.e., inactive content, is not.

In determining the current context, past user tendencies may be considered. With respect to past user tendencies, content updater 36 can log or otherwise track when and how a user interacts with a particular content item. Use patterns can be developed based on the user's actions. A use pattern can be stored and used predict future behavior of the user. Use patterns can be derived in any way and can be based on any information or events that are available to the mobile terminal. For example, if after a telephone call from her stock broker, a user always checks a financial web page, the current context with respect to the financial web page can be set to active when the user receives a call from the stock broker, but may otherwise be set to inactive.

User preferences may be considered in determining a current context. A user preference may be a setting provided by a user during a setup procedure. A user preference may be input by a user to set situations, criteria, thresholds or the like where the user would prefer that a content item be set to an active state. For example, rather than allow the mobile to determine a user tendency to set a financial web page to active when the broker calls, a user can input a preference that the financial web page be set to an active current context when the stock broker calls.

Current contexts can also be determined based upon the battery level of a battery, such as battery 34, of a mobile terminal. In some embodiments, if the battery level is determined to be lower than a predefined threshold then one or more content items (e.g., lower priority content items or content items that would require significant power and/or processing resources to update) may be set to an inactive current context. Conversely, if the battery level is determined to be higher than a predefined threshold then one or more content items may be set to an active current context. Similarly, if it is determined that a supplemental power source is connected to a battery or the mobile terminal, one or more content items can be set to have an active current context.

The location of a mobile terminal can also be used to determine a current context. The location of a mobile terminal, such as mobile terminal 10, can be determined via a positioning sensor, such as positioning sensor 37. The current context with respect to various content items can be set to an active or inactive in consideration of where the mobile terminal, and by association where the mobile terminal's user are located. For instance, one or more content items may be set to an inactive current context when a user is a work, since the user may have access to a computer in order to retrieve desired content items. Location may also be considered in that the time zone in which the mobile terminal is located may impact the setting of current contexts. Further, a current context may be set based on a rate of speed that is associated with a mobile terminal. For example, if the position sensor indicates that a mobile terminal is moving in excess of a threshold speed, e.g., 35 miles per hour, one or more content items may be set to an inactive current context, since a user may not need updated content while driving a car. Additionally, the position sensor may indicate that the individual is walking or running, via an accelerometer or the like, and a current context associated with one or more content items can be set to active or inactive using this information as well. Current contexts of content items may also be set to active or inactive when the mobile terminal is stationary for a threshold period of time.

The availability of particular networks, or network types may be considered in determining a current context. If a network having a particular communications rate or power consumption rate is detected, the current context of one or more content items can be set to active or inactive. In this regard, a threshold can be set with respect to communications rate or power consumption, and based on a network's characteristics with respect to the threshold a current context may be set to active or inactive. For example, if a Wi-Fi network is currently available then a current context for one or more content item may be set to active. Further, based on location information derived from a positioning sensor, it may be determined that the mobile terminal may soon move into a desirable or undesirable network area, and current contexts for content items can be set accordingly. Additionally, other attributes of a network may be considered, such as whether a network is a home network or whether a network is a foreign network, and if the network is a foreign network, whether additional charges may be associated with interacting with the foreign network.

Further, wireless or wired connectivity controlled by the mobile terminal may be considered in determining a current context. In this regard, the status of various transmitters and receivers on a mobile terminal may affect, or be considered in determining, a current context. For example, if a power conservation application, or other application, chooses to deactivate the wireless LAN radio, but leave the cellular radio active, these characteristics of the mobile terminal may be considered in determining a current context of a content item.

The time of day may also be considered when determining current contexts. For example, at 2:00 am in the morning it may be likely that a user is sleeping and as such it may be unnecessary to expend resources, such as power and processing, to update content at that time. Accordingly, one or more current contexts for various content items may be set to active or inactive based on the current time.

Figure 6:
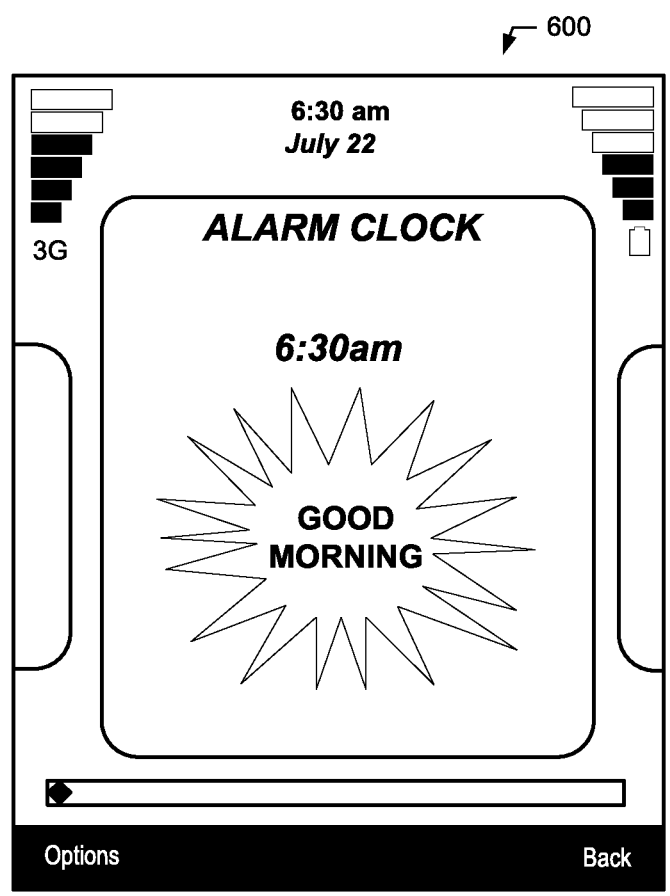
FIG. 6 is an illustration of an alarm clock event according to an exemplary embodiment of the present invention.

Scheduled events can also be considered in determining a current context. Scheduled events can include events stored in a calendar program, or an alarm clock event. Calendar events, such as, for example, a vacation event or a meeting event stored in a calendar program can be used to determine if a current context for one or more content items should be set to active or inactive. Additionally, an alarm clock event, where an alarm clock program is set to alarm at a particular time, can be considered when setting a current context. An exemplary alarm clock event 600 on a display of a mobile terminal is depicted in FIG. 6. With respect, to scheduled events, a current context may be activated or deactivated in advance of the scheduled event, and the length of time prior to the scheduled event may be set to define when the current context may change. Alternatively, a current context change may be anticipated based on the scheduled event. In anticipation of the scheduled event a context change can be effectuated at some time prior the scheduled event. For example, if an alarm clock feature is set to alarm at 7:00 am, the current context of one or more content items may be set to active at 6:55 am, i.e. the length of time prior to the alarm is set to 5 minutes, and current contexts associated with various content items may be updated at 6:55 am. Further, the length of time prior to the scheduled event may be selected such that sufficient time may be available to update content items having current contexts that may be affected by the scheduled event, but still relatively close to the occurrence of the event to in order for the content items to be relatively current.

Current user interactions with the mobile terminal may also be considered when determining a current context. For example, if a user is depressing keys on a keypad, such as keypad 30, or otherwise interacting with the mobile terminal, the actions of the user can be considered in determining a current context. In this regard, for example, the fact that a user is depressing keys, may be indicative that the user may also soon check a content item, and as such one or more content items may be set to an active current context. Additionally, if a user has not interacted with a mobile terminal for some threshold duration of time, the current context may be set with regard to this duration.

The current profile of a mobile device may also be considered in determining a current context of a content item. A current profile of a mobile terminal can be a setting or mode that the mobile terminal is placed into when the user is in various environments or situations. Current profiles can include, for example, silent, loud, vibrate, meeting, sleep, home, etc. In this regard, a current context may be modified when a user places the mobile terminal into a particular profile. In some embodiments, a user may schedule a profile change. For example, a user may schedule a mobile terminal to change profiles from "silent" to "normal" at 6:30 a.m. In this regard, the current context of a content item may be considered with respect to the scheduled profile change and/or the current profile of the mobile device.

As indicated above, the criteria described herein are merely exemplary criteria that may be considered when determining current contexts. Various additional or different criteria may be used to determine current contexts or other types of rules or algorithms can be employed to determine current contexts.

At 310, an occurrence of a triggering event can be identified. A triggering event can be identified by content updater 36, controller 20 of mobile terminal 10 or other means. A triggering event can be an event that can cause content updater 36 to check the current context of a content item to determine if an update to the content item should be initiated. A triggering event can be, for example, a timer that elapses at regular time intervals, for example, every 15 minutes. In this regard, when the timer elapses, content updater 36 can check the current context of content items to determine if the content items should be updated. Further, the duration of the timer may be dynamic with respect to various criteria, such as, battery level, connection to a supplemental power source, available networks, duration since the user last interacted with the mobile terminal, anyone or more of the various criteria described above, etc. For example, if it has been determined that a mobile terminal is connected to a supplemental power source, the timer intervals may be shortened to a lesser duration, such as, 7 minutes, since the mobile terminal does not need to rely solely on a battery for power. Further, different timers may be associated with different content items. For example, a content item that is an email account may be on a 15 minute timer, while a content item that is an RSS feed may be on a 1 hour timer.

A change in a current context from inactive to active may also be a triggering event for one or more content items. As such, changes in a current context of one or more content items from inactive to active may be defined as and separated into triggering and non-triggering events. A triggering change of a current context from inactive to active can cause an immediate initiation of an update of the content item since the content item's current context has been set to active and a triggering event (i.e., the change in context) has occurred. On the other hand, a non-triggering change of a current context to active can require the identification of a different triggering event prior to initiating an update of a content item. In this regard, a timer elapsing or another triggering event must occur prior to initiating a content item update since the change in context alone is insufficient.

At 320, the content item can be updated. A content item may be updated in response to a triggering event if the content item has a predefined current context. The operation at 320 can be performed by content updater 36, controller 20 or other means. In this regard, when a triggering event occurs, the current context of one or more content items can be ascertained. If a content item that is subject to the triggering event has an active current context, then an update of the content item can be initiated. In some embodiments, a request to perform an update with respect to a content item can be generated and transferred to various entities to perform the update, such as, for example, a preview module as described below. Further, if a content item that is subject to the triggering event is in an inactive current context, then no update with respect to that content item need be undertaken. If a content item has been updated, an indication that the update has occurred can be provided, such as a modified icon, or an audible tone. Further, the updated content item can include a time stamp indicating when the content item was last updated.

Content items may be updated in various ways. Email accounts may interact with an email server, web feeds may interact with a web server on the internet, etc., in order to download the latest information. In some embodiments, the content item can be updated by retrieving data from an associated source via a network, such as the network of FIG. 2, and storing the retrieved data in memory devices, such as volatile memory 40 or non-volatile memory 42, of mobile terminal 10. Further, updating a content item may also involve the utilization of another application, or interface, such as an RSS feed application, a plug-in, a widget or the like. In this regard, the retrieved data can be retrieved via the interface and stored directly on the mobile terminal and no formatting or other conditioning of the data need occur. However, in some embodiments, updates to content items may include conditioning data before storing the data on a mobile terminal. Data may be conditioned in various manners, and the conditioning may be performed by content updater 36, controller 20, or other means. Data used in updating a content item may also be conditioned by a network entity, such as computing system 52 or BS 44 prior to receipt by a mobile terminal.

In this regard, for example, a content item such as an email account may be updated by conditioning the data associated with the email account such that only the headers of received emails are received by the mobile terminal during an update. If a user desires to read the email, the body of the email or a portion of the body of the email may be retrieved at the request of a user.

Further, some data used to update a content item may be conditioned such that the data can easily be viewed on a display of a mobile terminal. In this regard, for example, images on a web page to be updated may be removed to facilitate easier reading of text associated with the web page.

Content items may also be updated by generating previews associated with the content item. Previews may be generated by content updater 36, controller 20, computing system 52, BS 44, or other means. A preview can be an indication of data retrieved from a source associated with a content item. In some embodiments, a preview can include raw image data organized as an image file and generated from data retrieved from a source of a content item. A preview may be stored on a mobile terminal as a bitmap or other image format. Metadata associated with the content item may also be included in a preview. A preview may also include associated metadata where the metadata may be links to various related content items that may be retrieved by interacting with the links.

Figure 7:
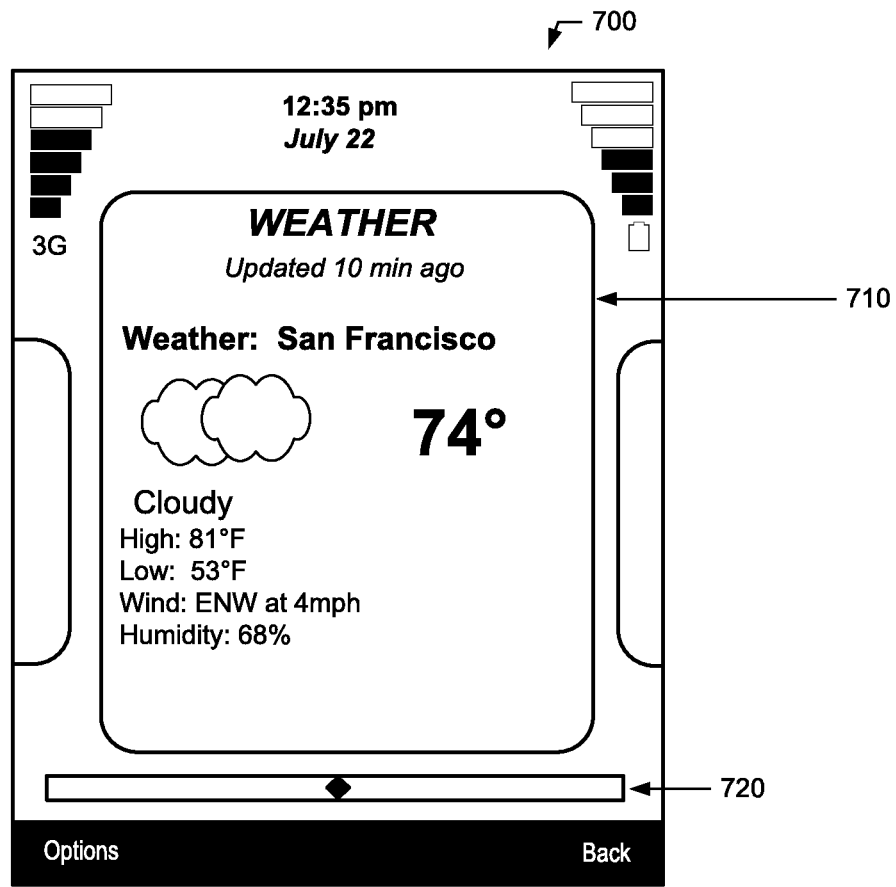
FIG. 7 is an illustration of a preview according to an exemplary embodiment of the present invention.
Figure 8:
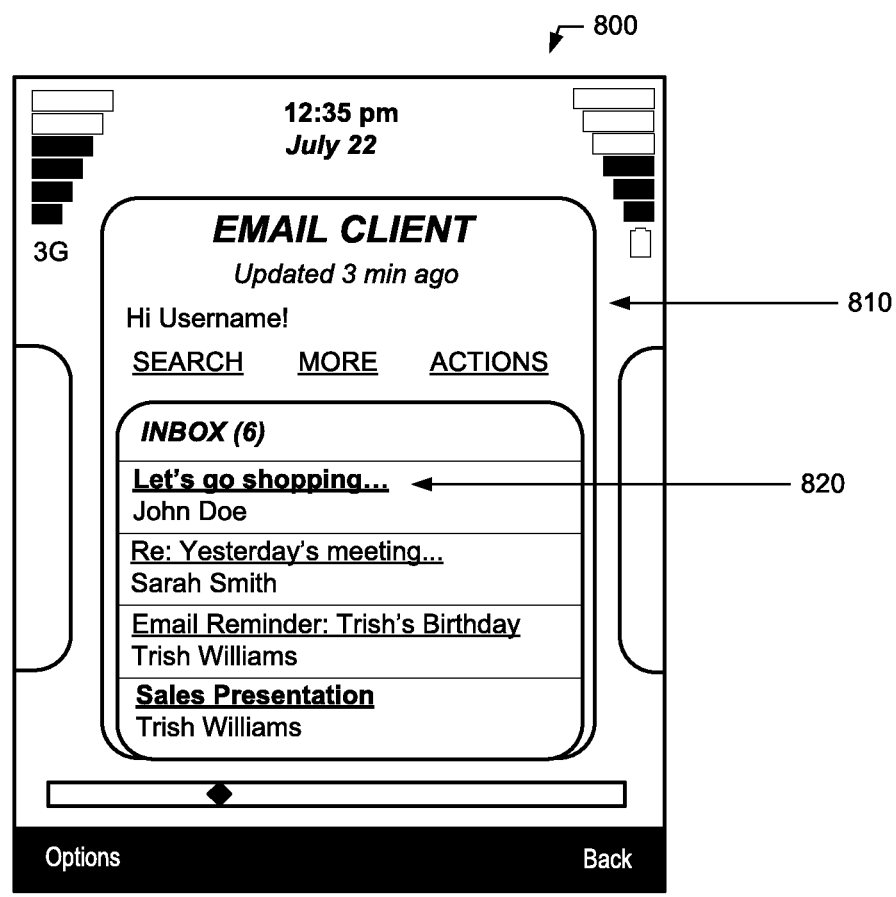
FIG. 8 is an illustration of a preview according to an exemplary embodiment of the present invention.

FIG. 7 depicts an exemplary preview 710 of a weather content item according to various embodiments of the present invention. The preview 710 can be viewed on a display 700. The preview 710 can include time update indicator 720 that can provide information regarding when the preview was generated. Applications used to view preview 710 can also include a scrolling indicator 720 that can be indicate where in a series of previews the currently viewed preview is located. FIG. 8 also depicts an exemplary preview 810. Preview 810 can be email client preview. Preview 810 can be viewed on a display 800. Preview 810 can also include a link 820 that can be implemented using metadata associated with the preview 810. Link 820 can be used to retrieve additional content items related to preview 810, such as, for example, the body of an email.

Figure 4:
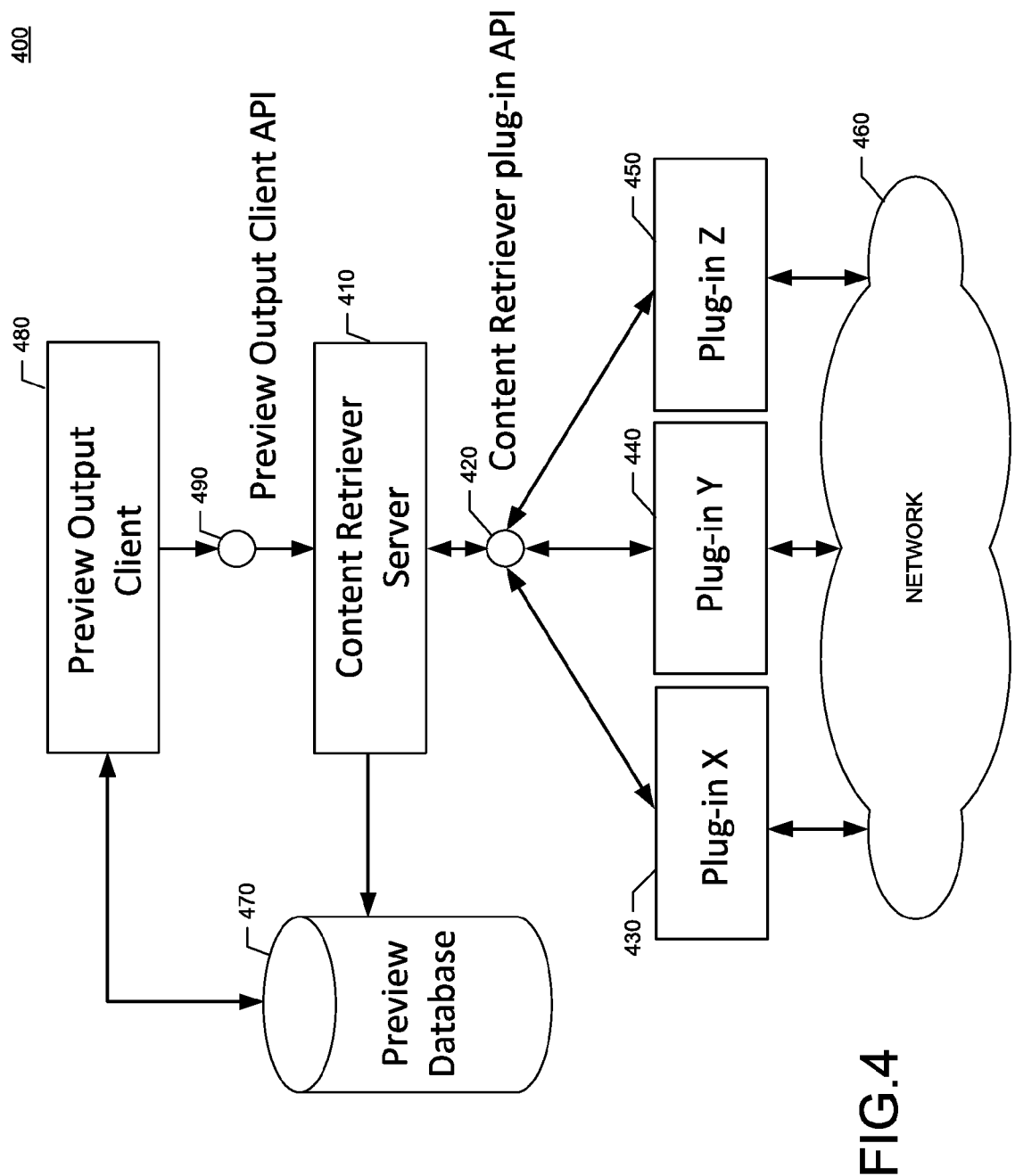
FIG. 4 is a block diagram of a preview module according to an exemplary embodiment of the present invention.

FIG. 4 is a block diagram of a preview module 400 for generating and utilizing previews according to various embodiments of the present invention. Preview module 400 may be any means, device or circuitry embodied in hardware, software, or a combination of hardware and software that is capable of generating and/or utilizing previews on the mobile terminal 10. Preview module 400, or portions of preview module 400, may be implemented in content updater 36, controller 20, computing system 52, BS 44 or other means. In various embodiments, preview module 400 can include a software application and an associated data structure that are stored in memory and can be executed by content updater 36, controller 20, computing system 52, BS 44 or combinations thereof. Preview module 400 can include a content retriever server 410, a content retriever plug-in application programming interface (API) 420, preview database 470, preview output client 480 and preview client output API 490. Other than preview output client 480, the remaining elements of preview module 400 can operate in the background and a user of a mobile terminal may be unaware of their operation.

Content retriever server 410 can include a software application that operates to retrieve a content item from various sources and conditions the content item into a preview. Content retriever server 410 and content retriever plug-in API can reside and operate on content updater 36 or controller 20 of mobile terminal 10, or computing system 52 or BS 44 or the communications system of FIG. 2.

Content retriever server 410 can receive a request to update a content item where the request includes an indication of an interface that may be used to retrieve the content item. Upon receipt of the request, content retriever server 410 can interface with content retriever plug-in API 420 to facilitate communication with various plug-ins. Content retriever plug-in API 420 can permit content retriever server 410 to seamlessly interact with plug-ins 430, 440 and 450 to retrieve data through the plug-ins to generate a preview. Content retriever plug-in API 420 can extend the ability of content retriever server 410 to generate previews with respect to any type of plug-in. Plug-in X 430, plug-in Y 440 and plug-in Z 450 can be any software application or interface that can connect to a network to retrieve data such as, but not limited to, to a browser, an RSS feed, a widget, web feed application or the like. As such, content retriever server 410 can implement plug-ins 430, 440 and/or 450 via content retriever plug-in API 420 to retrieve a content item without implementing a user interface that may be associated with a plug-in. Plug-ins 430, 440 and 450 can be in communication with network 460, where network 460 can be any type of network, such as the network of FIG. 2 or the Internet to retrieve a content item.

Upon retrieval of a content item, content retriever server 410 can condition the data associated with the content item into a preview that may be viewed as an image on a mobile terminal and interacted with via metadata. In some embodiments, content retriever server 410 may not render the retrieved content item to a display. Instead, content retriever server 410 can store the preview in preview database 470. Preview database 470 may reside on a mobile terminal, such as mobile terminal 10 and more particularly, preview database may be located in a memory device, such as volatile memory 40 or non-volatile memory 42 of mobile terminal 10.

Preview output client 480 can operate to retrieve a preview from preview database 470, provide for displaying the preview and allow for interaction with the preview. Preview out client 470 can also provide for scrolling or iteratively viewing previews with the assistance of a scrolling indicator. Preview output client 480 can reside on controller 20 of mobile terminal 10. Preview output client 480 can provide for the rendering of a preview on a display, such as display 28. Preview output client 480 can also provide for interaction with the preview, such as zooming of the preview and/or interaction with the metadata associated with the preview. Preview output client 480 can additionally launch applications associated with a preview. For example, via the preview an application, such as a browser, web feed, or the like, may be launched that may retrieve the actual content item. Via preview output client 480, a user may implement the retrieval of content items related to the preview. For example, a preview may include metadata that can be a link embedded in the image. A user may select the link causing a content item related to the link to be retrieved by the mobile terminal. Metadata may also include any type of information associated with a preview, such as information regarding, links, time stamps, and data that can be used to launch applications.

In order to retrieve a content item related to a preview, preview output client 410 can request the related content item via preview output client API 490. Preview output client API 490 may reside on controller 20 or content updater 36. Via preview output client API 490, preview output client 480 can interact with content retriever server 410. A request for a related content item can be received by content retriever server 410 from content output client 480. Content retriever server 410 can then retrieve the related content item via content retriever plug-in 420 and plug-ins 430, 440 and/or 450. Content retriever server 410 can then provide the related content item to preview output client 480 directly, generate a preview of the related content item and provide the preview directly via preview output client 480, or generate a preview of the additional content and store the preview in preview database 470 for retrieval by preview output client 480.

Figure 5:
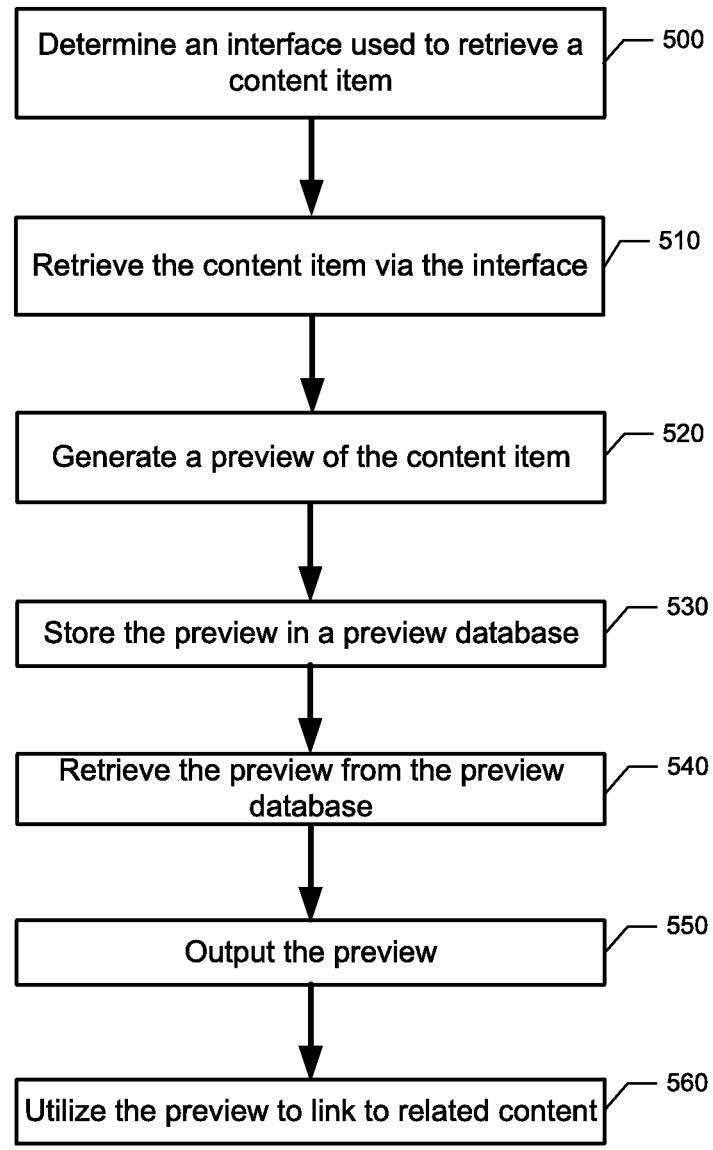
FIG. 5 is a flowchart of a method of generating and utilizing a preview according to an exemplary embodiment of the present invention.

FIG. 5 is a flowchart of a method of generating and utilizing a preview according to an exemplary embodiment of the present invention. The operations of the exemplary method of FIG. 5 may be implemented in controller 20, content updater 36, computing system 52, BS 44, other means or combinations thereof.

At 500, an interface used to retrieve a content item can be determined. The interface can be a plug-in or other application used to retrieve data, such as plug-ins 430, 440 or 450. The interface can be determined from data that may be included with a content item that indicates an interface or application that can be used to retrieve the content item. At 510, a content item can be retrieved via the interface. In this regard, a content retriever server 410 and a content retriever plug-in API 420 can interact with the interface to retrieve the content item. At 520, a preview of the content item can generated. A preview can be generated by a content retriever server 410. At 530, the preview can be stored in a preview database. Content retriever server 410 can store the preview in preview database 470. At 540, the preview can be retrieved from the preview database. A preview output client 480 can retrieve the preview from the preview database 470. At 550, the preview can be output. Preview output client 480 can output the preview via an output device, such as display 28. At 560, the preview can be utilized to link to a related content item. Preview output client 480 can provide for interactions with the preview to link to, and retrieve, related content through the use of metadata associated with the preview.

According to one aspect of the present invention, controller 20, content updater 36, computing system 52 or BS 44, which implement exemplary embodiments of the present invention, generally operate under control of computer-readable program code portions that may be stored on a computer-readable storage medium to form a computer program product. The computer program product for performing the methods of exemplary embodiments of the present invention includes a computer-readable storage medium and computer-readable program code portions, such as a series of computer instructions, embodied in the computer-readable storage medium.

In this regard, FIGS. 3 and 5 are flowcharts of methods, and program products according to exemplary embodiments of the present invention. It will be understood that each block or step of the flowcharts, and combinations of blocks in the flowcharts, can be implemented by computer program instructions. These computer program instructions may be loaded onto a computer or other programmable apparatus, such as controller 20, content updater 36, computing system 52 or BS 44 to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the present invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining, with a processor, that a current context of a first content item is inactive;
   identifying an occurrence of a triggering event occurring before an activation of the current context of the first content item;
   receiving an indication of the activation of the current context of the first content item after the occurrence of the triggering event and setting the current context as a predefined context of the first content item;
   in response to receiving the indication of the activation of the current context of the first content item after the occurrence of the triggering event, causing storing of a usage pattern related to the first content item and the associated triggering event; and
   in response to a subsequent occurrence of the triggering event and based on the stored usage pattern, causing a subsequent activation of the current context of the first content item.

2. The method of claim 1, wherein identifying the occurrence of the triggering event comprises receiving an indication of a received communication.

3. The method of claim 2, wherein the received communication is associated with a particular contact.

4. The method of claim 1, wherein determining the current context of the first content item is based on a current time and one or more scheduled events.

5. The method of claim 1, wherein determining the current context of the first content item is based upon a current battery level.

6. The method of claim 1, wherein identifying the occurrence of the triggering event comprises determining that a timer associated with the first content item has become exhausted.

7. The method of claim 1, wherein identifying the occurrence of the triggering event includes identifying an upcoming alarm having an associated duration which defines a timing of the triggering event.

8. An apparatus comprising at least one processor and at least one memory including computer program code, the at least one memory and the computer program code configured to, with the at least one processor, direct the apparatus at least to:
   determine that a current context of a first content item is inactive;
   identify an occurrence of a triggering event occurring before an activation of the current context of the first content item;
   receive an indication of the activation of the current context of the first content item after the occurrence of the triggering event and set the current context as a predefined context of the first content item;
   in response to receiving the indication of the activation of the current context of the first content item after the occurrence of the triggering event, cause storing of a usage pattern related to the first content item and the associated triggering event; and
   in response to a subsequent occurrence of the triggering event and based on the stored usage pattern, cause a subsequent activation of the current context of the first content item.

9. The apparatus of claim 8, wherein identifying the occurrence of the triggering event comprises receiving an indication of a received communication.

10. The apparatus of claim 9, wherein the received communication is associated with a particular contact.

11. The apparatus of claim 8, wherein determining the current context of the first content item is based on a current time and one or more scheduled events.

12. The apparatus of claim 8, wherein determining the current context of the first content item is based upon a current battery level.

13. The apparatus of claim 8, wherein identifying the occurrence of the triggering event comprises determining that a timer associated with the first content item has become exhausted.

14. The apparatus of claim 8, wherein identifying the occurrence of the triggering event includes identifying an upcoming alarm having an associated duration which defines a timing of the triggering event.

15. A computer program product comprising at least one non-transitory computer-readable storage medium having computer-readable program code portions stored therein, the computer-readable program code portions being configured to, when executed, direct an apparatus to:
   determine that a current context of a first content item is inactive;

identify an occurrence of a triggering event occurring before an activation of the current context of the first content item;

receive an indication of the activation of the current context of the first content item after the occurrence of the triggering event and set the current context as a predefined context of the first content item;

in response to receiving the indication of the activation of the current context of the first content item after the occurrence of the triggering event, cause storing of a usage pattern related to the first content item and the associated triggering event; and in response to a subsequent occurrence of the triggering event and based on the stored usage pattern, cause a subsequent activation of the current context of the first content item.

16. The computer program product of claim 15, wherein identifying the occurrence of the triggering event comprises receiving an indication of a received communication.

17. The computer program product of claim 16, wherein the received communication is associated with a particular contact.

18. The computer program product of claim 15, wherein determining the current context of the first content item is based on a current time and one or more scheduled events.

19. The computer program product of claim 15, wherein identifying the occurrence of the triggering event comprises determining that a timer associated with the first content item has become exhausted.

20. The computer program product of claim 15, wherein identifying the occurrence of the triggering event includes identifying an upcoming alarm having an associated duration which defines a timing of the triggering event.

* * * * *